US009146919B2

(12) United States Patent
Epstein et al.

(10) Patent No.: US 9,146,919 B2
(45) Date of Patent: Sep. 29, 2015

(54) BOOTSTRAPPING NAMED ENTITY CANONICALIZERS FROM ENGLISH USING ALIGNMENT MODELS

(71) Applicant: Google Inc., Mountain View, CA (US)

(72) Inventors: Mark Edward Epstein, Katonah, NY (US); Pedro J. Mengibar, Jersey City, NJ (US)

(73) Assignee: Google Inc., Mountain View, CA (US)

(*) Notice: Subject to any disclaimer, the term of this patent is extended or adjusted under 35 U.S.C. 154(b) by 282 days.

(21) Appl. No.: 13/830,969

(22) Filed: Mar. 14, 2013

(65) Prior Publication Data

US 2014/0200876 A1 Jul. 17, 2014

Related U.S. Application Data

(60) Provisional application No. 61/753,089, filed on Jan. 16, 2013.

(51) Int. Cl.
*G06F 17/28* (2006.01)
*G06F 17/27* (2006.01)

(52) U.S. Cl.
CPC .......... *G06F 17/289* (2013.01); *G06F 17/278* (2013.01); *G06F 17/28* (2013.01)

(58) Field of Classification Search
CPC ..... G05F 17/20; G05F 17/27; G05F 17/2785; G05F 17/28; G05F 17/2827; G05F 17/2872; G05F 17/289
USPC ................ 704/2, 4, 5, 8, 9, 10, 257
See application file for complete search history.

(56) References Cited

U.S. PATENT DOCUMENTS

| | | | |
|---|---|---|---|
| 5,970,449 A | 10/1999 | Alleva et al. | |
| 8,249,855 B2 | 8/2012 | Zhou et al. | |
| 8,374,844 B2 | 2/2013 | Brun et al. | |
| 8,380,486 B2 | 2/2013 | Soricut et al. | |
| 2002/0173946 A1* | 11/2002 | Christy | 704/2 |
| 2005/0010421 A1* | 1/2005 | Watanabe et al. | 704/277 |
| 2005/0102614 A1 | 5/2005 | Brockett et al. | |
| 2007/0156748 A1 | 7/2007 | Emam et al. | |
| 2008/0215309 A1* | 9/2008 | Weischedel et al. | 704/3 |
| 2009/0157385 A1* | 6/2009 | Tian | 704/9 |
| 2009/0204596 A1* | 8/2009 | Brun et al. | 707/5 |
| 2010/0106484 A1 | 4/2010 | U et al. | |
| 2010/0217582 A1 | 8/2010 | Waibel et al. | |
| 2012/0232885 A1 | 9/2012 | Barbosa et al. | |

OTHER PUBLICATIONS

Saquete et al., "Evaluation of the automatic multilinguality for time expression resolution," Proceedings / 15th International Workshop on Database and Expert Systems Applications, Aug. 30-Sep. 3, 2004, Zaragoza, Spain, IEEE Computer Society, Los Alamitos, Calif. [U.A.], Aug. 30, 2004, pp. 25-30.

(Continued)

*Primary Examiner* — Qi Han
(74) *Attorney, Agent, or Firm* — Fish & Richardson P.C.

(57) ABSTRACT

Methods, systems, and apparatus, including computer programs encoded on a computer storage medium, for training recognition canonical representations corresponding to named-entity phrases in a second natural language based on translating a set of allowable expressions with canonical representations from a first natural language, which may be generated by expanding a context-free grammar for the allowable expressions for the first natural language.

20 Claims, 6 Drawing Sheets

(56) References Cited

OTHER PUBLICATIONS

Bentivogli et al., "Exploiting parallel texts in the creation of multilingual semantically annotated resources: the MultiSemCor Corpus," Natural Language Engineering, vol. 11, No. 03, Sep. 21, 2005, p. 247-261.

International Search Report and Written Opinion in International Application No. PCT/US2013/068699, mailed May 28, 2014, 16 pages.

International Preliminary Report on Patentability in International Application No. PCT/US2013/068699, mailed Jul. 30, 2015, 10 pages.

* cited by examiner

BOOTSTRAPPING NAMED ENTITY CANONICALIZERS FROM ENGLISH USING ALIGNMENT MODELS

CROSS-REFERENCE TO RELATED APPLICATIONS

This application claims the benefit of U.S. Provisional Application No. 61/753,089, filed Jan. 16, 2013, which is incorporated herein in its entirety by reference.

FIELD

This specification describes technologies related to machine translation and natural language understanding.

BACKGROUND

A useful task in speech recognition technology is the ability to recognize named entities. Some approaches have used hand crafted grammars to recognize named entities, but such an approach can be labor-intensive and inefficient.

SUMMARY

An approach to recognizing named entities, not previously used, is to use a grammar to generate sample expressions for the named entities in a natural language and associate them with their canonical representations. This approach then machine translates the sample expressions from that natural language to another natural language. The machine translation produces training data to train a model recognizing the canonical representations for that named entity in the other language.

In general, one innovative aspect of the subject matter described in this specification can be embodied in methods that provide training data that associates expressions in a second natural language with their canonical representations. The training data is obtained by taking expressions in a first natural language that have been associated with canonical representations and translating the expressions in the first natural language into the second natural language using a machine translator.

According to one innovative aspect of the subject matter described in this specification, a set of acceptable expressions is received, each acceptable expression being a string that identifies a value of a variable entity in a first natural language, each acceptable expression being associated with a canonical representation of the value identified by that expression. Machine translation is then performed on each acceptable expression to obtain a translated expression of the acceptable expression in a second natural language. The canonical representation associated with each acceptable expression is then associated with the corresponding translated expression in the second natural language. Then, a set of training data is provided for a machine translator from expressions in the second natural language to the associated canonical representations, the set of training data comprising the translated expressions and the canonical representations that are associated with the translated expressions.

Other embodiments of these aspects include corresponding systems, apparatus, and computer programs, configured to perform the actions of the methods, encoded on computer storage devices.

These and other embodiments may each optionally include one or more of the following features. For instance, the process may include generating the set of acceptable expressions from a language defined by a context-free grammar by using the formation rules of the grammar, each acceptable expression being a string defined by the context-free grammar that identifies a particular value of a variable entity in the first natural language, and additionally associating a canonical representation of the value of the variable entity each acceptable expression identifies with each acceptable expression in the set of acceptable expressions. Furthermore, in such an embodiment the set of acceptable expressions may include all possible strings that can be generated using the formation rules of the grammar.

Also, the process may further include training a machine translator, using the set of training data, to translate acceptable expressions for a value of the variable entity in the second natural language to the corresponding canonical representations. Furthermore, in such an embodiment the machine translator may receive information about the context of the acceptable expression to be translated and use the context information to help translate acceptable expressions in the second natural language to corresponding canonical representations. Additionally, the process may include receiving an expression in the second natural language, using the machine translator, translating the expression from the second natural language to its canonical representation, and using the machine translator, translating the canonical representation into an equivalent expression in a third natural language. Also, the set of acceptable expressions further comprises acceptable expressions that are strings that identify values of a variable entity in a third natural language.

Particular embodiments of the subject matter described in this specification can be implemented so as to realize one or more of the following advantages. Embodiments allow automatic association of named entity inputs in a natural language with their canonical representation without the need to hand craft a grammar in the natural language. Instead, it is possible to simply utilize a grammar in another language to bootstrap training data that allows association of the expressions with the canonical representations. Furthermore, machine translation allows association of the expressions in a manner that is more flexible than is possible with a grammar alone, as grammars tend to be more rigid about matching.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Natural language systems are almost always built with named entities in their models. For example, rather than having "I want to fly from Boston to Denver next Saturday", the system instead is built with the sentence "I want to fly from <CITY> to <CITY> <DATE>". In this way, the system is more general and requires less training data.

Sometimes, the named entities can be simple lists of values. For example, <CITY> in the above example. However, consider issues involved in recognizing <DATE>. Dates in any language are likely to be organized and recognized in very regular formats. For example, the formats may include "Month Day Year", "Day of Month Year", etc. These formats are most commonly represented by grammars that specify what the user can say, and how to canonicalize the values. For example, the date grammar might recognize "Fifth of May next year" and return "05/05/2013".

Creating a grammar for a system has two major challenges. It requires the system to find a language expert, train the expert as to how the named entity is going to be used as part of the larger system, then have the expert write the grammar, debug the grammar, and tune the grammar. Secondly, even after the initial system is built, it may be necessary to tweak the grammar. If the language expert is no longer available, then this process has to be "begun" all over again with a new expert.

The embodiments described in this specification propose approaching the problem of training a system that can recognize named entities when the system has training information for another language by treating the problem as a "machine translation" problem, and bootstrapping the training data from the grammars already written for other languages.

Machine translation and natural language understanding are at the heart of this invention. In addition, grammar induction is very similar. For example, the system could take lots of date phrases, then "learn" a grammar. The challenge here is that the system needs to be able to associate a date phrase with its canonical value so as to be able to identify in an absolute, unambiguous manner, what particular date is referred to by a user.

A system may begin with a high-quality grammar for a type of named entity inputs, such as dates. The grammar will allow many ways that dates can be expressed, as well as the canonical value for each date. Thus, a grammar might have "May first", "May one", "first of May", "5/1", all with the canonical value "05/01". Such a grammar may be a hand crafted context-free grammar that specifies for a natural language (such as English) all of the different possible or allowable ways to articulate dates in the natural language. However, in addition to simple examples of ways to articulate dates, other, less straightforward ways of expressing dates may be relevant. For example, in addition to "December 25$^{th}$", a user may wish to express that date as "Christmas", or alternatively a user may wish to use the term "next Tuesday," defining a date in relation to the current date.

Embodiments operate by causing each example in the initial natural language, e.g., the English language, defined by the context-free grammar to be translated into another language using one or more machine translation systems. This translation can be done with the "raw" phrase, in terms of the words in the initial natural language that are used to express a given date. In addition, the recognition task might also be aided by surrounding the <DATE> with the most common domain-specific phrases that <DATE>'s appear in. For example "flying on <DATE>" or "a train on <DATE>". While the type of transportation is not relevant to the specific date in question, these phrases can help indicate that information that is indicative of a date is proximate to these phrases.

A system can also build up data to improve the recognition process by using different grammars from multiple languages. For example, if a system have access to hand crafted English and German <DATE> grammars, it is possible to use these to create sample sentences in English and German, along with the canonical values, and then translate the English and German sample sentences into another language, such as Italian. Such translation will be discussed in greater detail, below. After translating the English and/or German phrases into Italian, it is possible to extract the Italian date phrases and store them in association with the canonical values.

From this, the most common approach to recognizing the named entities, known in the art, is to induce a grammar. However, embodiments propose a different, advantageous alternative approach to recognizing named entities. Due to possible word orderings or segmentation in other languages, embodiments use the approach of building a machine translation system that aligns the words in the new language to the canonical values. As part of the machine translation process, it is possible to align parts of the translation and learn not only what the canonical equivalents of an English date expression are, but also which parts of the date expression align to which parts of the canonical representation. For example, for "May first", "May" aligns to "05" and "first" aligns to "01", with "/" being an organizational separator.

Thus, for example, it becomes possible to get thousands of examples of Italian expressions for dates with the canonical values (by machine translating training data, such as that obtained from English and German grammars as above). Once the training data has been obtained, it becomes possible to build a model that learns how the various words in the Italian system align to canonical values. Alternatively, the training data can also be used to induce a grammar or build a language model for how dates are spoken in Italian.

The grammar or language model for dates can then be used as part of a speech and natural language system. Once a date is recognized, the string can be put through the machine translation algorithm, which can generate the canonical value directly.

A new and unique aspect of this approach is that it allows a system to build the models for how named entities are spoken, phrased, and referred to in other languages, without actually needing a grammar or domain expert. This ability facilitates the rapid creation and development of validators, annotators, and canonicalizers in many languages.

The approach of embodiments differs from other approaches. For example, it may be used instead of the approach used to move from one grammar to another by asking a person to translate the rules of the grammar. In that approach, a language expert might have a date grammar for English, and the expert would try to translate the rules directly into other languages. For languages that have similar word orders this approach might work partially. However, in general, this approach will not work for most international languages. Also, this approach does not allow using two or more hand crafted source grammars at the same time as the basis for building a new grammar. However, the most significant problem with adapting the grammatical rules directly is that translating rules generally requires human participation to make sure that the translation is successful. Trying to translate grammatical rules automatically is a very difficult problem.

Instead, using the one or more grammars to create training data, translating the training data, then rebuilding a new model, is much more likely to produce useful results and is an approach that is better adapted to automatic implementation. Once a system establishes how the system would refer to the named entity in one of the training languages, it is established what an appropriate way to refer to it is in practice and an appropriate equivalent in the destination language can be determined. For example, if a system begins by recognizing that "Christmas" is a way of referring to "12/25" in English, it can become possible to realize that "Navidad" corresponds to the same date in Spanish.

This approach and algorithm can be used to create the validators and annotators used in voice actions for mobile operating systems in multiple languages. The approach likely could be used by any company building natural language applications in multiple languages, because the approach is an advantageous way to pursue building natural language applications in natural languages quickly.

Various embodiments will now be discussed in connection with the drawings to explain their operation.

Figure 1:
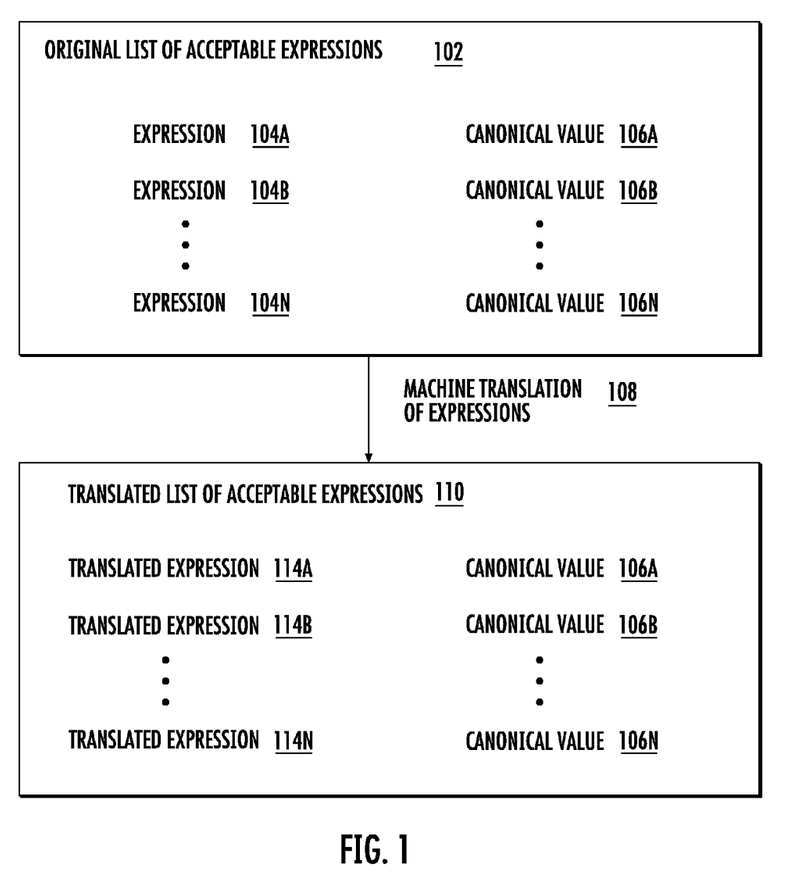
FIG. 1 is a block diagram of dataflow involved in the operation of an embodiment that translates expressions associated with canonical expressions from one natural language to another.

FIG. 1 is a block diagram of dataflow involved in the operation of an embodiment that translates expressions associated with canonical expressions from one natural language to another.

The dataflow that is central to the operation of embodiments is the translation of an original list of acceptable expressions 102, by machine translation of expressions 108, to a translated list of acceptable expressions 110. It may be noted that original list of acceptable expressions 102 includes a list of multiple expressions 104A . . . 104n that are stored in association with information about canonical values 106A . . . 106n that are the canonical representations corresponding with original expressions 104A . . . 104n as discussed above. An example of information that may be stored in original list of acceptable expressions 102 might be a variety of ways of expressing dates as expressions 104A . . . 104n. One potential source of the information that is stored as original list of acceptable expressions 102 is the expansion of one or more context-free grammars, as will be discussed with relation to FIG. 2. However, other sources for the information in original list of acceptable expressions 102 exist. For example, the list may be generated by hand by a user, or may be assembled by machine learning that assembles the list by tracking previously recorded associations between expressions and canonical representations.

Thus, expressions 104A . . . 104n include a list of expressions for named entity fields and the canonical values 106A . . . 106n with which they are associated. In one embodiment, expressions 104A . . . 104n include expressions from only one natural language, whereas in another embodiment, 104A . . . 104n may include expressions from more than one natural language. However, canonical values 106A . . . 106n should all be in the same format and the canonical value should be in a format which is not ambiguous. For example, with respect to dates, it may be unclear if 12/10/2010 is a canonical value for October 12, 2010 or December 10, 2010. Hence, it is desirable to represent and store the canonical values in a manner that there is no question which specific date or other information is referred to by the canonical value. This issue of ambiguity will be discussed further later on. For example if an input is "twelve-ten", a system will need to figure out whether the user is referring to December 10$^{th}$ or October 12$^{th}$.

One important stage that occurs as embodiments generate training data is to perform machine translation of expressions 108 from original list of acceptable expressions 102 to translated list of acceptable expressions 110. Translated list of acceptable expressions 110 includes translated expressions 114A . . . 114n, each of which is the result of machine translation of expressions 108 for expressions 104A . . . 104n. Translated expressions 114A . . . 114n are all translations into a second natural language for which an application, such as a validator, annotator, or canonicalizer, is to be built. Thus, translated expressions 114A . . . 114n are each stored in association with canonical values 106A . . . 106n that were previously associated with expressions 104A . . . 104n.

Thus, the overall task accomplished by embodiments is that the original list of acceptable expressions 102 is stored with canonical values, and then the machine translation of expressions 108 is performed such that a translated list of acceptable expressions 110 becomes available to provide information about ways that the canonical values would be referred to in the new language.

Figure 2:
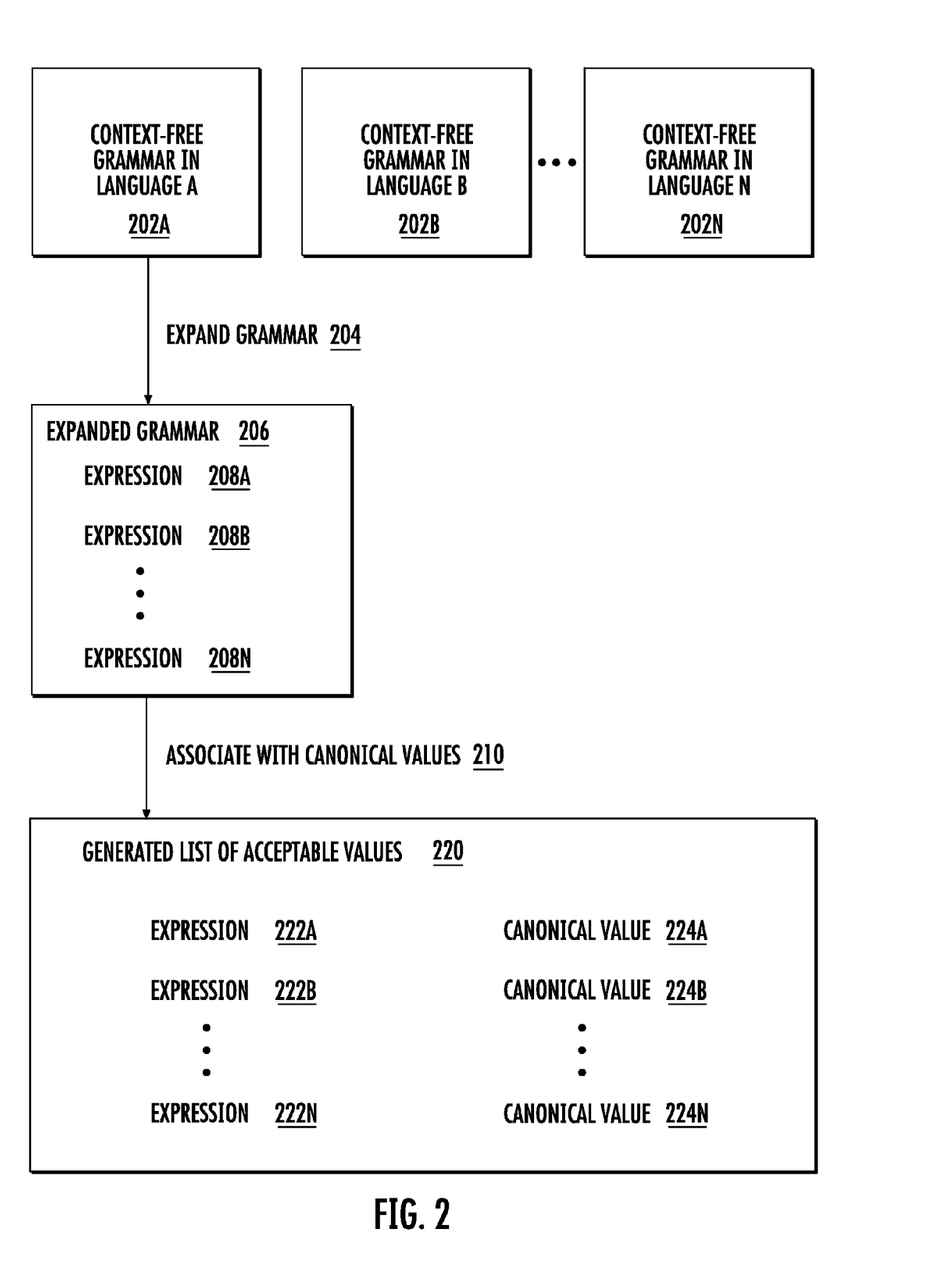
FIG. 2 is a block diagram of the use of context-free grammars to generate data that can be translated.

FIG. 2 is a block diagram of the use of context-free grammars to generate data that can be translated. A context-free grammar is a type of formal grammar, where a formal grammar is a set of formation rules for strings in a formal language. In context-free grammars, every production rule is of the form V→w, where V is a single nonterminal symbol, and w is a string of terminals and/or nonterminals (w can be empty). A formal grammar is considered "context-free" when its production rules can be applied regardless of the context of a nonterminal.

In FIG. 2, the process of generating data for providing training data begins with context-free grammar in language A 202A. While embodiments only require that there be at least one context-free grammar as a source of expressions, FIG. 2 shows that there may also be other context-free grammars, including context-free grammar in language B 202B, continuing to context-free grammar in language N 202n. However, since these other context-free grammars are optional, FIG. 2 illustrates only the application of context-free grammar in language A 202A.

In FIG. 2, context-free grammar in language A 202A provides rules that define alternative expressions in language A that represent valid candidates for the relevant named entity. For example, some of the production rules in the grammar might be:

Date→<Month><Day>, <Year>
Month→January|February|March|April|May|June|July|August|September|October|November|December
Day→<Number>
Year→<Number>

Such production rules, which are only a small sample of those provided in a complete grammar, would allow the generation of date expressions, such as May 5, 2012. By traversing the rules in such a grammar so as to systematically generate each alternative expression, it is possible to take this step to expand grammar 204. In some embodiments, every candidate expression that is possible as a result of expanding the grammar 204 is gathered in expanded grammar 206, whereas in other embodiments, the expanded grammar 206 only includes a subset of the grammar. The subset may be chosen to only include expansion candidates that are judged to be more frequently used or satisfy some other criterion, such as only candidates that are shorter than a threshold length.

Thus, expanded grammar 206 is generated such that it includes expressions 208A . . . 208n. While FIG. 2 presents a scenario in which the expanded grammar 206 is the result of a complete action to expand the grammar 204 for context-free grammar 202A, it will be noted that expanded grammar may only include a subset of the expressions produced by context-free grammar 202A, as well as all or some of the expressions produced by other context-free grammars 202B . . . 202n. Once expanded grammar 206 is produced, in order to produce a data set that is suitable for use in the dataflow of FIG. 1 (that is, as original list of acceptable expressions 102), it is appropriate to associate with canonical values 210 the expanded grammar 206. The association produces a generated list of accepted values 220. Generated list of accepted values 220 includes a list of expressions 222A . . . 222n, which have been generated as above form expanding the grammars as well as having been associated with canonical values 224A ... 224n. Generated list of accepted values 220 can then be used as original list of acceptable expressions 102 for processing as in FIG. 1.

Thus, FIG. 2 illustrates that a way to obtain the information that is used for the translation performed in FIG. 1 is to expand all or part of one or more hand crafted grammars 202A ... 202n, gather the expressions produced by expanding the grammars, and then associate them with canonical values in a way that provides the information that is needed after the expressions have been machine translated.

Figure 3:
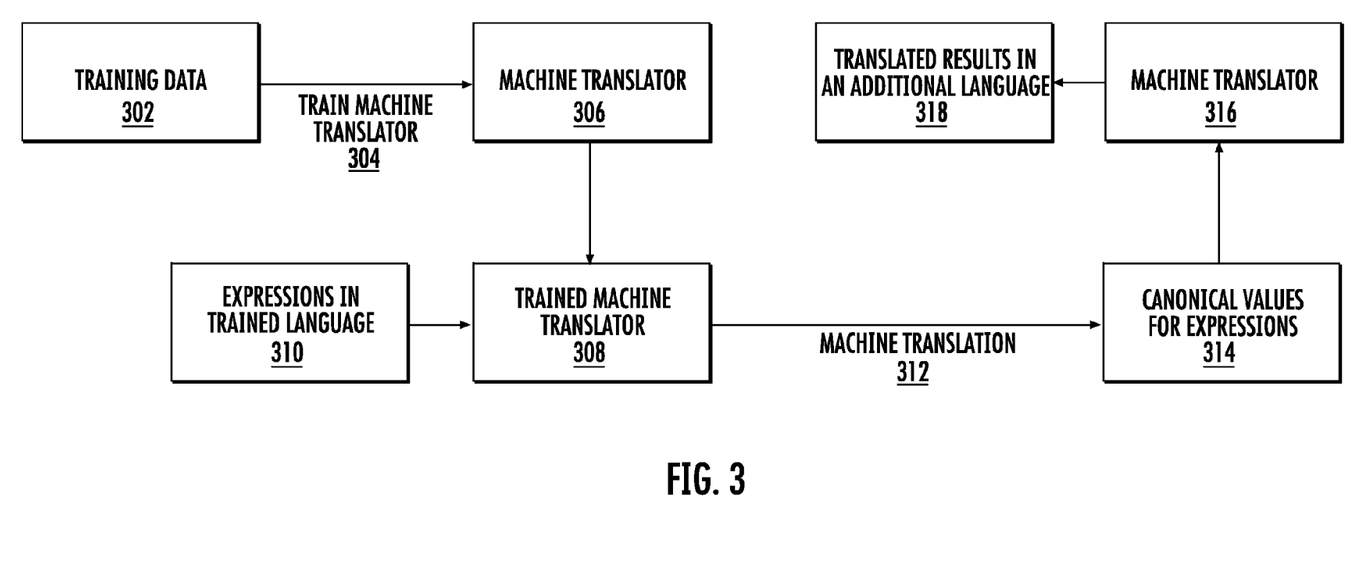
FIG. 3 is a block diagram of parts of the dataflow in an example embodiment.

FIG. 3 is a block diagram of parts of the dataflow in an example embodiment. FIG. 3 illustrates how certain embodiments use the training data produced in FIG. 1 in an advantageous manner. The dataflow begins with training data 302. Training data 302 comprises translated list of acceptable expressions 108 that may be produced by machine translation of expressions 108 in FIG. 1. In additional to translated expressions 114A ... 114n, the list includes canonical values 106A ... 106n associated with them. Also associated with the training data 302 is information about which natural language the translated expressions 114A ... 114n are in. Training data 302 is used for the step of training machine translator 304, which turns machine translator 306 into a trained machine translator 308. The training of machine translator 306 proceeds by using existing methods of training a machine translator, based on the training data 302. This allows the embodiment to train machine translator 306 such that machine translator 306 becomes able to recognize which expressions in the new language correspond to which canonical representations.

For example, "Christmas" may have been associated with the canonical date "12/25" such that the canonical representation also includes the information that "12" is the twelfth month (i.e. December) and "25" is the twenty-fifth day of that month. Suppose that the phrase Christmas was translated into French, such that it is translated to become "Noel". Thus, training machine translator 306 will cause trained machine translator 308 to realize that a French-speaking user who identifies "Noel" actually means "12/25".

Therefore, trained machine translator 308 receives expressions in the trained language 310 and uses the trained machine translator 308 to perform machine translation 312 that provides canonical values for expressions 314. As another example, the user might say "le quatorze juillet." This would be the French equivalent of the English date, "July 14$^{th}$". Based on this equivalency and training process, an embodiment would realize that these two natural-language expressions are referring to the same canonical date, "07/14". Hence, trained machine translator 308 would produce canonical values for expressions 314 by machine translation 312 after the training has occurred.

FIG. 3 illustrates that an additional task that can occur, after receiving the canonical values for expressions 314. The additional task is another machine translation 316 process that occurs. For example, machine translation 316 may take canonical values for expressions 314, and then provide translated results in an additional language 318. For example, suppose that trained machine translator 308 has recognized a canonical date corresponding to expressions in a trained language 310 where the trained language is French, trained based on information from English and German grammars. Suppose that machine translator 316 has the canonical date in French. By producing translated results in an additional language 318, the canonical representation can be used as the basis for any other language for which machine translation is available, as it is known how to take a canonical representation for a date, such as "12/25" and either express that as the twenty-fifth day of December or as Christmas, in any desired target additional language 318, from Mandarin to Italian.

Figure 4:
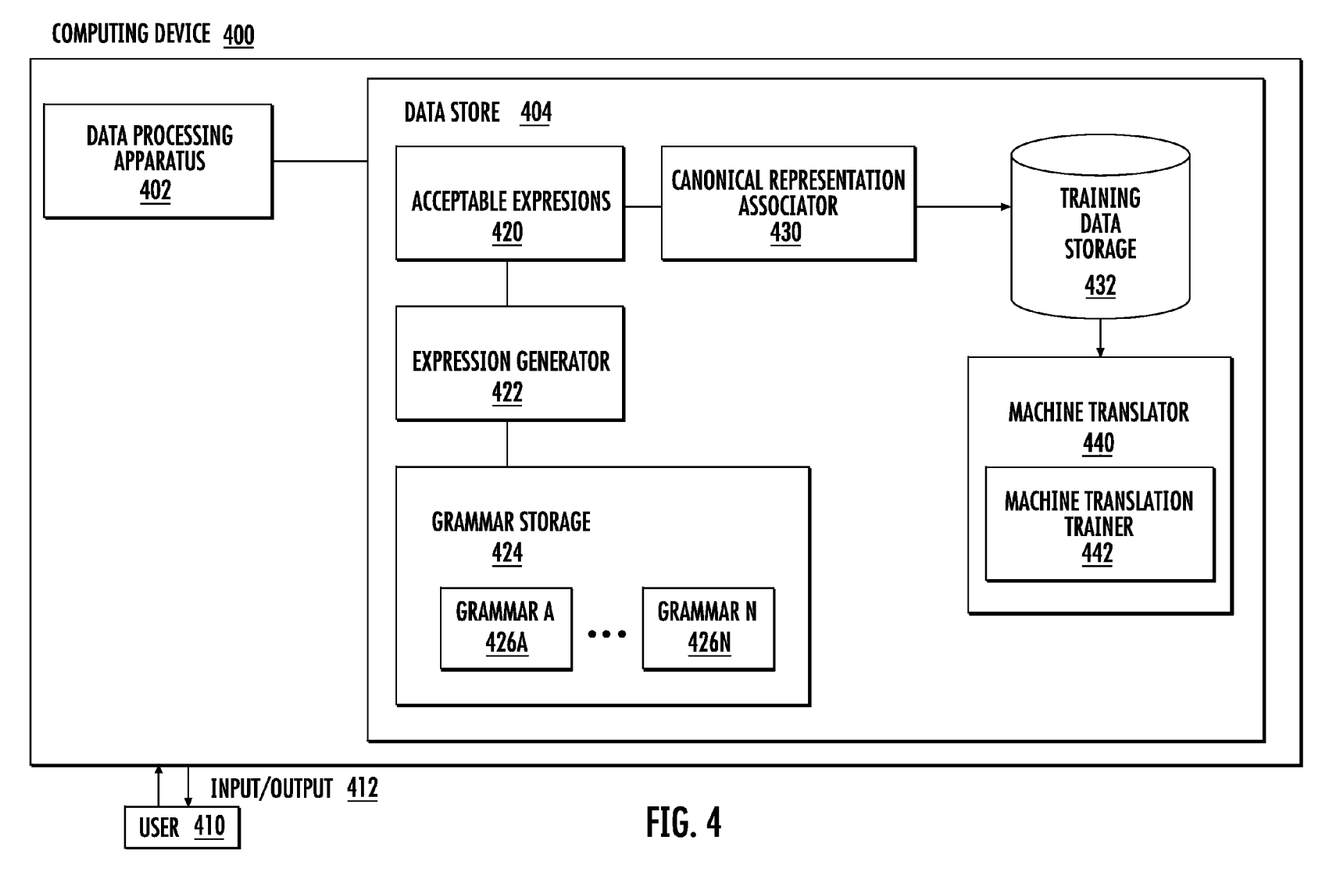
FIG. 4 is a block diagram of an example system that can associate expressions with canonical representations.

FIG. 4 is a block diagram of an example system that can associate expressions with canonical representations. For example, FIG. 4 includes computing device 400 that includes a data processing apparatus 402 that is communicatively coupled to a data store 404. Computing device 400 is able to communicate with user 410, user 410 being able to send and receive input/output 412 to interchange information with computing device 400.

The data processing apparatus 402 and data store 404 include subsystems and infrastructure that provide functionality for computing device 400. These subsystems include a storage for acceptable expressions 420. The acceptable expressions 420 may be generated by expression generator 422. Expression generator 422 may perform the task of generating expressions based on expanding grammars stored in grammar storage 424. These grammars may include a plurality of individual grammars 426A ... 426n.

The acceptable expressions 420 may additionally be processed by a canonical representation associator 430. Canonical representation associator 430 uses information provided by expression generator 422 and associates canonical representation information with acceptable expressions 420. After canonical representation associator 430 has added the information about canonical representations to the expressions, the expressions are stored, along with the canonical representation information in a training data storage 432. Training data storage 432 then provides the training data to machine translator 440, which uses a machine translation trainer 442 subsystem to use the training data to associate the training data from training data storage with another natural language.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Figure 5:
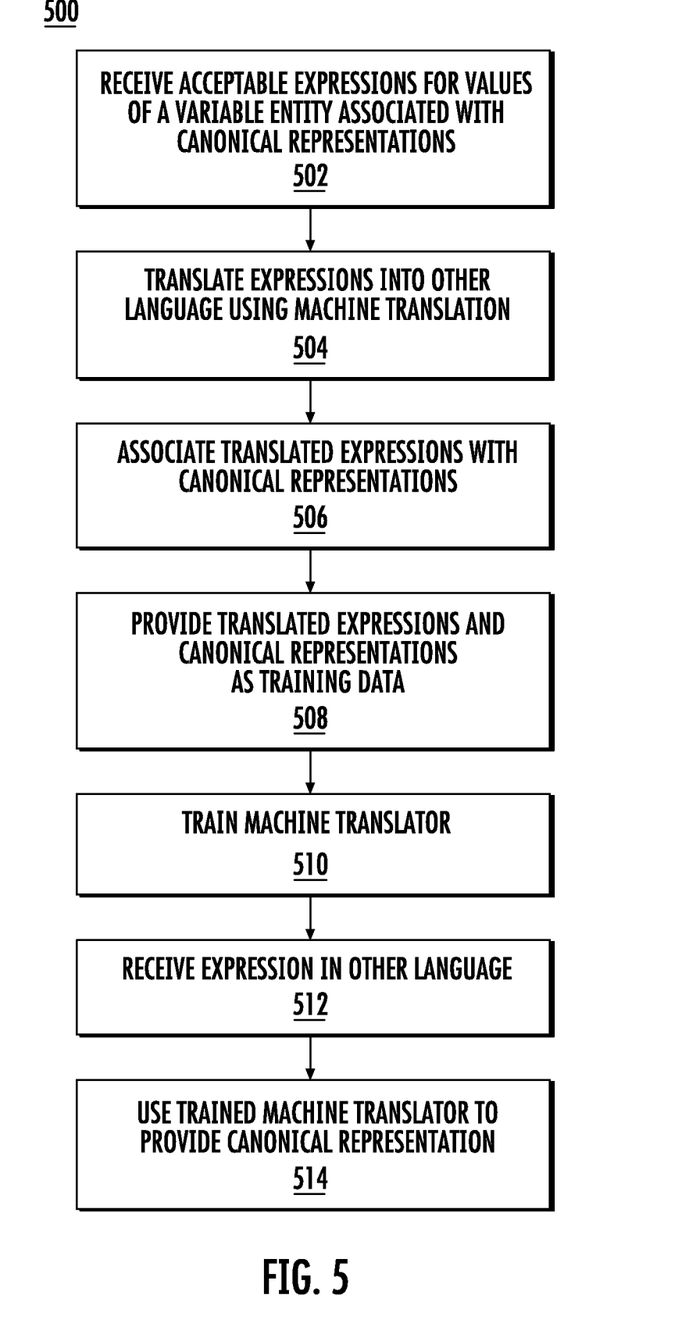
FIG. 5 is a flowchart of the stages illustrating an example process for generating training data for associating expressions with canonical representations.

FIG. 5 is a flowchart of the stages illustrating an example process for generating training data for associating expressions with canonical representations.

Stage 502 comprises receiving acceptable expressions for values of a variable entity associated with canonical representations. For example, stage 502 may be performed by using expression generator 422 to expand one or more grammars 426A . . . 426n in grammar storage 424 to generate acceptable expressions 420 and add canonical representation information by canonical representation associator 430 before storing it in training data storage 432.

Stage 504 comprises translating expressions into another language using machine translation. For example, stage 504 may be performed by machine translator 440.

Stage 506 comprises associating translated expressions with canonical representations. For example, stage 506 may be performed by canonical representation associator 430 operating on the results that are produced by machine translator 440.

Stage 508 comprises providing translated expressions and canonical representations as training data. For example, stage 508 may be performed by storing the results of the association produced in stage 506 as new data in training data storage 452.

Stage 510 comprises training a machine translator. For example, stage 510 may be performed by using machine translation trainer 442 on machine translator 440 using training data previously stored in training data storage 432.

Stage 512 comprises receiving an expression in another language. For example, the expression in another language may be received as input/output 412 from user 410. For example, user 410 may articulate a date expression in French after computing device 400 has performed the other stages to learn how to canonicalize French dates based on training data in other languages.

Stage 514 comprises using a trained machine translator to provide a canonical representation. For example, stage 514 may be performed by machine translator 440. After it has been trained by the use of machine translation trainer 442, machine translator 440 may establish what the canonical representation of input/output 412 provided by user 410 should be.

It may be noted that some embodiments will operate using a process which includes additional steps or omits certain steps, while remaining true to the overall goal of training recognition of canonical representations of natural language expressions. As discussed above, some embodiments may process the canonical representation information further to provide further conclusions and results.

Figure 6:
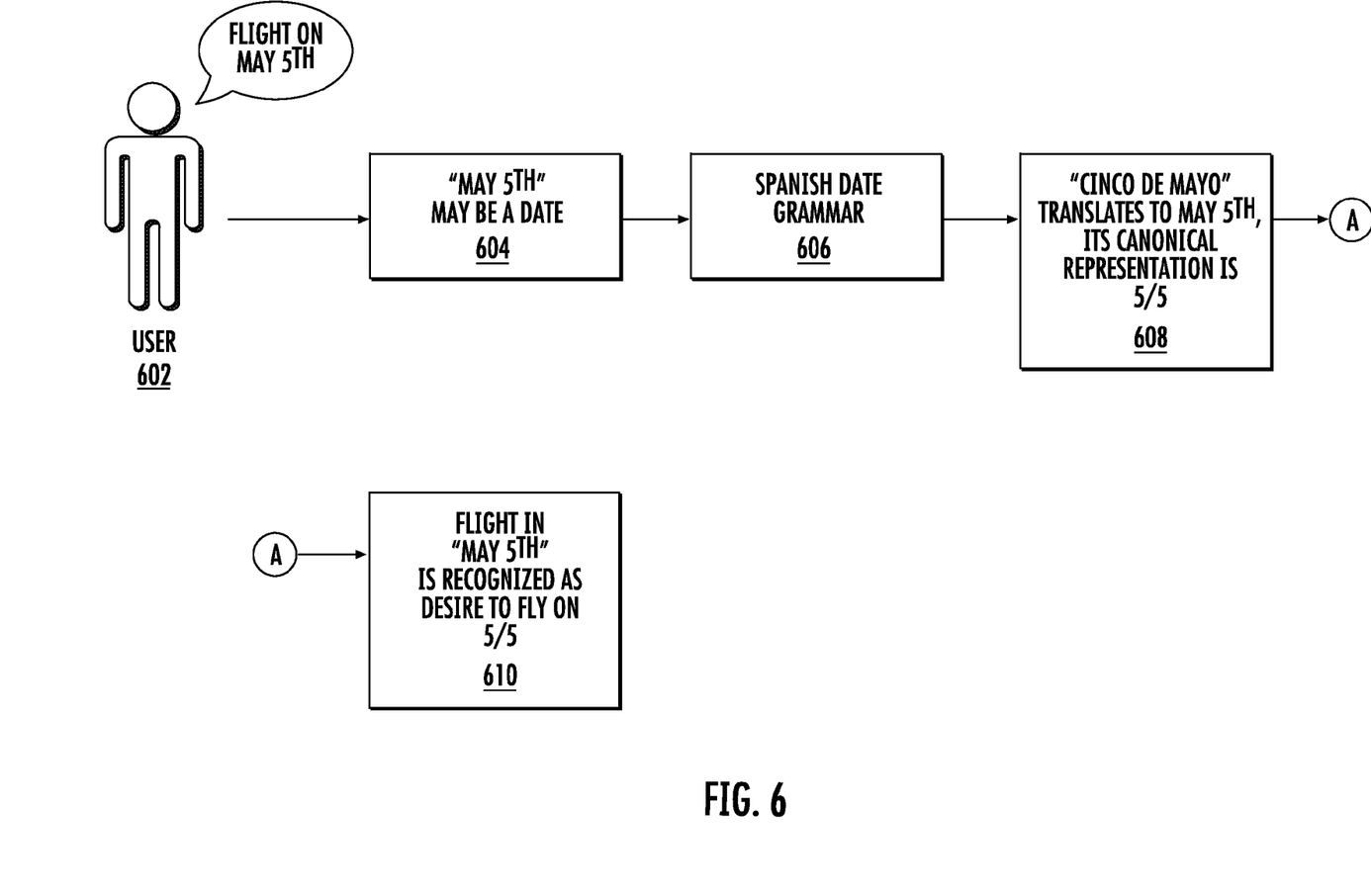
FIG. 6 is an illustration of steps in an example use case of an embodiment.

FIG. 6 is an illustration of steps in an example use case of an embodiment.

FIG. 6 illustrates user 602 uttering the statement, "Flight on May $5^{th}$". The embodiment recognizes at stage 604 that "May $5^{th}$" may be a date because its context is "Flight on". As depicted in FIG. 6, this example use case employs a Spanish hand crafted grammar to train the relationship between Spanish and English canonical representations at stage 606. As part of this training, the embodiment establishes at stage 608 that "Cinco de Mayo," from the Spanish grammar, translates to the English expression "May $5^{th}$", and the canonical representation is "05/05" (fifth day of the fifth month, which is May). Based on this information, the embodiment is able to conclude, at stage 610, that "Flight on May $5^{th}$" relates to a desire to fly on "05/05."

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, the method comprising:

receiving a set of acceptable expressions, each acceptable expression being a string that identifies a value of a variable entity in a first natural language, each acceptable expression being associated with a canonical representation of the value identified by that expression;

performing, a first machine translator that translates expressions from the first natural language to a second natural language, machine translation on each acceptable expression in the first natural language to obtain a translated expression of the acceptable expression in the second natural language;

associating the canonical representation associated with each acceptable expression with the corresponding translated expression in the second natural language;

providing a set of training data for training a second machine translator that translates expressions in the second natural language that each include a respective translated expression to expressions in the second natural language that each include a respective canonical representation, the set of training data comprising the translated expressions and the canonical representations that are associated with the translated expressions; and using the second machine translator to translate a particular expression that includes a particular translated expression into a particular translated expression that includes a particular canonical representation.

2. The method of claim 1, further comprising:

generating the set of acceptable expressions from a language defined by a context-free grammar by using formation rules of the grammar, each acceptable expression in the set of acceptable expressions being a string defined by the context-free grammar that identifies a particular value of a variable entity in the first natural language; and associating a canonical representation of the value of the variable entity each acceptable expression identifies with each acceptable expression in the set of acceptable expressions.

3. The method of claim 2, wherein the set of acceptable expressions includes all possible strings that can be generated using the formation rules of the grammar.

4. The method of claim 1, further comprising:
training the second machine translator, using the set of training data, to translate acceptable expressions for a value of the variable entity in the second natural language to corresponding canonical representations.

5. The method of claim 4, wherein the second machine translator receives information about the context of an acceptable expression for a value of the variable entity in the second language to be translated to a corresponding canonical representation and uses the context information to help translate the acceptable expression for the value of the variable entity in the second natural language to a corresponding canonical representation.

6. The method of claim 4, further comprising:
receiving an expression in the second natural language;
using the second machine translator, translating at least a portion of the expression from the second natural language to a canonical representation of the at least a portion of the expression; and
using a third machine translator, translating the canonical representation of the at least a portion of the expression into an equivalent expression in a third natural language.

7. The method of claim 1, wherein the set of acceptable expressions further comprises acceptable expressions that are strings that identify values of a variable entity in a third natural language.

8. A system comprising:
a data processing apparatus; and
a data store storing instructions executable by the data processing apparatus that upon execution by the data processing apparatus cause the data processing apparatus to perform operations comprising:
receiving a set of acceptable expressions, each acceptable expression being a string that identifies a value of a variable entity in a first natural language, each acceptable expression being associated with a canonical representation of the value identified by that expression;
performing, using a first machine translator that translates expressions from the first natural language to a second natural language, machine translation on each acceptable expression in the first natural language to obtain a translated expression of the acceptable expression in the second natural language;
associating the canonical representation associated with each acceptable expression with the corresponding translated expression in the second natural language;
providing a set of training data for training a second machine translator that translates expressions in the second natural language that each include a respective translated expression to expressions in the second natural language that each include a respective canonical representation, the set of training data comprising the translated expressions and the canonical representations that are associated with the translated expressions; and using the second machine translator to translate a particular expression that includes a particular translated expression into a particular translated expression that includes a particular canonical representation.

9. The system of claim 8, wherein the operations further comprise:
generating the set of acceptable expressions from a language defined by a context-free grammar by using formation rules of the grammar, each acceptable expression in the set of acceptable expressions being a string defined by the context-free grammar that identifies a particular value of a variable entity in the first natural language; and
associating a canonical representation of the value of the variable entity each acceptable expression identifies with each acceptable expression in the set of acceptable expressions.

10. The system of claim 9, wherein the set of acceptable expressions includes all possible strings that can be generated using the formation rules of the grammar.

11. The system of claim 8, wherein the operations further comprise:
training the second machine translator, using the set of training data, to translate acceptable expressions for a value of the variable entity in the second natural language to corresponding canonical representations.

12. The system of claim 11, wherein the second machine translator receives information about the context of an acceptable expression for a value of the variable entity in the second language to be translated to a corresponding canonical representation and uses the context information to help translate the acceptable expression for the value of the variable entity in the second natural language to a corresponding canonical representation.

13. The system of claim 11, wherein the operations further comprise:
receiving an expression in the second natural language;
using the second machine translator, translating at least a portion of the expression from the second natural language to a canonical representation of the at least a portion of the expression; and
using a third machine translator, translating the canonical representation of the at least a portion of the expression into an equivalent expression in a third natural language.

14. The system of claim 8, wherein the set of acceptable expressions further comprises acceptable expressions that are strings that identify values of a variable entity in a third natural language.

15. A non-transitory computer storage medium encoded with a computer program, the program comprising instructions that when executed by a data processing apparatus cause the data processing apparatus to perform operations comprising:
receiving a set of acceptable expressions, each acceptable expression being a string that identifies a value of a variable entity in a first natural language, each acceptable expression being associated with a canonical representation of the value identified by that expression;
performing, sing a first machine translator that translates expressions from the first natural language to a second natural language, machine translation on each acceptable expression in the first natural language to obtain a translated expression of the acceptable expression in the second natural language;
associating the canonical representation associated with each acceptable expression with the corresponding translated expression in the second natural language;

providing a set of training data for training a second machine translator that translates expressions in the second natural language that each include a respective translated expression to expressions in the second natural language that each include a respective canonical representation, the set of training data comprising the translated expressions and the canonical representations that are associated with the translated expressions; and using the second machine translator to translate a particular expression that includes a particular translated expression into a particular translated expression that includes a particular canonical representation.

16. The computer storage medium of claim 15, wherein the operations further comprise:

generating the set of acceptable expressions from a language defined by a context-free grammar by using formation rules of the grammar, each acceptable expression in the set of acceptable expressions being a string defined by the context-free grammar that identifies a particular value of a variable entity in the first natural language; and associating a canonical representation of the value of the variable entity each acceptable expression identifies with each acceptable expression in the set of acceptable expressions.

17. The computer storage medium of claim 15, wherein the operations further comprise:

training the second machine translator, using the set of training data, to translate acceptable expressions for a value of the variable entity in the second natural language to corresponding canonical representations.

18. The computer storage medium of claim 17, wherein the second machine translator receives information about the context of an acceptable expression for a value of the variable entity in the second language to be translated to a corresponding canonical representation and uses the context information to help translate the acceptable expression for the value of the variable entity in the second natural language to a corresponding canonical representation.

19. The computer storage medium of claim 17, wherein the operations further comprise:

receiving an expression in the second natural language;

using the second machine translator, translating at least a portion of the expression from the second natural language to a canonical representation of the at least a portion of the expression; and using a third machine translator, translating the canonical representation of the at least a portion of the expression into an equivalent expression in a third natural language.

20. The computer storage medium of claim 15, wherein the set of acceptable expressions further comprises acceptable expressions that are strings that identify values of a variable entity in a third natural language.

\* \* \* \* \*